US008679570B2

(12) United States Patent
Goraltchouk et al.

(10) Patent No.: US 8,679,570 B2
(45) Date of Patent: *Mar. 25, 2014

(54) FOAM-LIKE MATERIALS AND METHODS FOR PRODUCING SAME

(75) Inventors: Alexei Goraltchouk, Santa Barbara, CA (US); Jordan M. Thompson, Scotts Valley, CA (US); Miram M. Abiad, Costa Mesa, CA (US); Kevin A. Ma, Scotts Valley, CA (US); Dennis E. Van Epps, Goleta, CA (US); Nicholas J. Manesis, Summerland, CA (US)

(73) Assignee: Allergan, Inc., Irvine, CA (US)

( * ) Notice: Subject to any disclaimer, the term of this patent is extended or adjusted under 35 U.S.C. 154(b) by 107 days.

This patent is subject to a terminal disclaimer.

(21) Appl. No.: 13/093,505

(22) Filed: Apr. 25, 2011

(65) Prior Publication Data
US 2011/0313073 A1 Dec. 22, 2011

Related U.S. Application Data

(60) Provisional application No. 61/328,358, filed on Apr. 27, 2010, provisional application No. 61/329,518, filed on Apr. 29, 2010.

(51) Int. Cl.
*B05D 3/00* (2006.01)
*A61L 33/00* (2006.01)
*A61F 2/12* (2006.01)
*A61F 2/52* (2006.01)

(52) U.S. Cl.
USPC .................................. 427/2.24; 623/7; 623/8

(58) Field of Classification Search
USPC ......................................... 427/2.24; 623/7–8
See application file for complete search history.

(56) References Cited

U.S. PATENT DOCUMENTS

| 2,805,208 A | 9/1957 | Roche |
| 3,103,408 A * | 9/1963 | Chen et al. .................... 264/321 |
| 3,189,921 A | 6/1965 | Pangman |
| 3,293,663 A | 12/1966 | Cronin |
| 3,366,975 A | 2/1968 | Pangman |
| 3,559,214 A | 2/1971 | Pangman |
| 3,600,718 A | 8/1971 | Boone |
| 3,665,520 A | 5/1972 | Perras |
| 3,700,380 A | 10/1972 | Kitrilakis |
| 3,852,832 A | 12/1974 | McGhan |

(Continued)

FOREIGN PATENT DOCUMENTS

| EP | 0230672 | 8/1987 |
| EP | 0315814 | 5/1989 |

(Continued)

OTHER PUBLICATIONS

Barr et al. Current Implant Surface Technology: An Examination of Their Nanostructure and Their Influence on Fibroblast Alignment and Biocompatibility, 2009.*

(Continued)

*Primary Examiner* — Dah-Wei Yuan
*Assistant Examiner* — Diane Zhang
(74) *Attorney, Agent, or Firm* — Linda Fox

(57) ABSTRACT

Described herein are foam-like materials having substantially the same physical structure of polyurethane foams but with properties that can be tailored for a particular application. Methods of forming these foam-like materials are also described.

12 Claims, 10 Drawing Sheets

(56) References Cited

U.S. PATENT DOCUMENTS

| | | | |
|---|---|---|---|
| 3,934,274 A | 1/1976 | Hartley, Jr. | |
| 4,034,751 A | 7/1977 | Hung | |
| 4,051,296 A * | 9/1977 | Windecker | 428/322.7 |
| 4,157,085 A | 6/1979 | Austad | |
| 4,231,979 A | 11/1980 | White | |
| 4,264,990 A | 5/1981 | Hamas | |
| 4,298,997 A | 11/1981 | Rybka | |
| 4,298,998 A | 11/1981 | Naficy | |
| 4,329,385 A | 5/1982 | Banks | |
| 4,428,082 A | 1/1984 | Naficy | |
| 4,433,440 A | 2/1984 | Cohen | |
| 4,470,160 A | 9/1984 | Cavon | |
| 4,482,577 A | 11/1984 | Goldstein | |
| 4,499,211 A | 2/1985 | Walch et al. | |
| 4,531,244 A | 7/1985 | Hamas | |
| 4,573,999 A | 3/1986 | Netto | |
| 4,584,324 A | 4/1986 | Baumann et al. | |
| 4,592,755 A | 6/1986 | Penton | |
| 4,610,690 A | 9/1986 | Tiffany | |
| 4,636,213 A | 1/1987 | Pakiam | |
| 4,643,733 A | 2/1987 | Becker | |
| 4,647,618 A | 3/1987 | Baumann et al. | |
| 4,648,880 A | 3/1987 | Brauman | |
| 4,650,487 A | 3/1987 | Chaglassian | |
| 4,651,717 A | 3/1987 | Jakubczak | |
| 4,681,587 A | 7/1987 | Eberl | |
| 4,740,208 A | 4/1988 | Cavon | |
| 4,772,285 A | 9/1988 | Ksander | |
| 4,773,908 A | 9/1988 | Becker | |
| 4,773,909 A | 9/1988 | Chaglassian | |
| 4,790,848 A | 12/1988 | Cronin | |
| 4,795,464 A | 1/1989 | Eberl | |
| 4,795,475 A * | 1/1989 | Walker | 128/898 |
| 4,803,025 A | 2/1989 | Brockmeyer | |
| 4,828,560 A | 5/1989 | Heyler | |
| 4,840,628 A | 6/1989 | Cavon | |
| 4,841,992 A | 6/1989 | Sasaki | |
| 4,859,383 A | 8/1989 | Dillon | |
| 4,859,712 A | 8/1989 | Cox | |
| 4,889,744 A * | 12/1989 | Quaid | 427/2.24 |
| 4,899,764 A | 2/1990 | Gauger | |
| 4,902,294 A | 2/1990 | Gosserez | |
| 4,906,423 A | 3/1990 | Frisch | |
| 4,936,858 A | 6/1990 | O'Keeffe | |
| 4,944,749 A | 7/1990 | Becker | |
| 4,944,750 A | 7/1990 | Cox, Jr. | |
| 4,950,292 A | 8/1990 | Audretsch | |
| 4,955,907 A | 9/1990 | Ledergerber | |
| 4,955,909 A | 9/1990 | Ersek | |
| 4,960,425 A * | 10/1990 | Yan et al. | 623/8 |
| 4,965,430 A | 10/1990 | Curtis | |
| 4,969,899 A | 11/1990 | Cox, Jr. | |
| 5,002,572 A | 3/1991 | Picha | |
| 5,007,929 A * | 4/1991 | Quaid | 623/8 |
| 5,007,940 A | 4/1991 | Berg | |
| 5,011,494 A | 4/1991 | von Recum et al. | |
| 5,022,942 A * | 6/1991 | Yan et al. | 156/219 |
| 5,026,394 A | 6/1991 | Baker | |
| 5,034,422 A | 7/1991 | Triolo | |
| 5,035,249 A | 7/1991 | Sasaki | |
| 5,092,348 A | 3/1992 | Dubrul | |
| 5,092,882 A | 3/1992 | Lynn | |
| 5,104,409 A | 4/1992 | Baker | |
| 5,116,387 A | 5/1992 | Berg | |
| 5,135,959 A | 8/1992 | Hill | |
| 5,146,933 A | 9/1992 | Boyd | |
| 5,147,398 A | 9/1992 | Lynn | |
| 5,158,571 A | 10/1992 | Picha | |
| 5,158,573 A | 10/1992 | Berg | |
| 5,171,269 A | 12/1992 | Bark | |
| 5,185,297 A | 2/1993 | Park | |
| 5,207,709 A | 5/1993 | Picha | |
| 5,219,361 A | 6/1993 | von Recum et al. | |
| 5,236,453 A | 8/1993 | Picha | |
| 5,236,454 A | 8/1993 | Miller | |
| 5,236,457 A | 8/1993 | Devanathan | |
| 5,246,454 A | 9/1993 | Peterson | |
| 5,282,856 A | 2/1994 | Ledergerber | |
| 5,296,069 A | 3/1994 | Robert | |
| 5,348,788 A | 9/1994 | White | |
| 5,354,338 A | 10/1994 | Ledergerber | |
| 5,358,521 A | 10/1994 | Shane | |
| 5,376,117 A | 12/1994 | Pinchuk | |
| 5,383,929 A | 1/1995 | Ledergerber | |
| 5,437,824 A * | 8/1995 | Carlisle et al. | 264/50 |
| 5,441,919 A | 8/1995 | Park | |
| 5,447,535 A | 9/1995 | Muller | |
| 5,455,100 A | 10/1995 | White | |
| 5,480,430 A | 1/1996 | Carlisle | |
| 5,496,367 A | 3/1996 | Fisher | |
| 5,496,370 A | 3/1996 | Hamas | |
| 5,507,808 A | 4/1996 | Becker | |
| 5,522,896 A | 6/1996 | Prescott | |
| 5,525,275 A | 6/1996 | Iverson | |
| 5,534,023 A | 7/1996 | Henley | |
| 5,545,217 A | 8/1996 | Offray | |
| 5,545,220 A | 8/1996 | Andrews | |
| 5,549,671 A | 8/1996 | Waybright | |
| 5,571,179 A | 11/1996 | Manders | |
| RE35,391 E | 12/1996 | Brauman | |
| 5,589,176 A | 12/1996 | Seare | |
| 5,605,693 A | 2/1997 | Seare | |
| 5,607,473 A | 3/1997 | Weber-Unger | |
| 5,624,674 A | 4/1997 | Seare, Jr. | |
| 5,630,843 A | 5/1997 | Rosenberg | |
| 5,630,844 A | 5/1997 | Dogan | |
| 5,653,755 A | 8/1997 | Ledergerber | |
| 5,656,710 A * | 8/1997 | Newberth et al. | 528/14 |
| 5,658,330 A | 8/1997 | Carlisle | |
| 5,674,285 A | 10/1997 | Quaid | |
| 5,681,572 A * | 10/1997 | Seare, Jr. | 424/400 |
| 5,779,734 A | 7/1998 | Ledergerber | |
| 5,798,065 A | 8/1998 | Picha | |
| 5,824,081 A | 10/1998 | Knapp | |
| 5,843,189 A | 12/1998 | Perouse | |
| 5,855,588 A | 1/1999 | Young | |
| 5,871,497 A | 2/1999 | Young | |
| 5,895,423 A | 4/1999 | Becker | |
| 5,935,164 A | 8/1999 | Iversen | |
| 5,961,552 A | 10/1999 | Iversen | |
| 5,964,803 A | 10/1999 | Iversen | |
| 5,965,076 A | 10/1999 | Banks | |
| 5,984,943 A | 11/1999 | Young | |
| 5,993,716 A | 11/1999 | Draenert | |
| 6,071,309 A | 6/2000 | Knowlton | |
| 6,074,421 A | 6/2000 | Murphy | |
| 6,083,262 A | 7/2000 | Caravel | |
| 6,099,565 A | 8/2000 | Sakura | |
| 6,113,634 A | 9/2000 | Weber-Unger | |
| 6,146,418 A | 11/2000 | Berman | |
| 6,183,514 B1 | 2/2001 | Becker | |
| 6,187,043 B1 | 2/2001 | Ledergerber | |
| 6,203,570 B1 | 3/2001 | Baeke | |
| 6,206,930 B1 | 3/2001 | Burg | |
| 6,214,045 B1 | 4/2001 | Corbitt, Jr. | |
| 6,214,926 B1 | 4/2001 | Winn | |
| 6,315,796 B1 | 11/2001 | Eaton | |
| 6,340,648 B1 | 1/2002 | Imura et al. | |
| 6,387,133 B1 | 5/2002 | Perouse | |
| 6,432,138 B1 * | 8/2002 | Offray et al. | 623/8 |
| 6,464,726 B1 | 10/2002 | Heljenek | |
| 6,520,989 B1 | 2/2003 | Eaton | |
| 6,531,523 B1 | 3/2003 | Davankov | |
| 6,544,287 B1 * | 4/2003 | Johnson et al. | 623/7 |
| 6,602,452 B2 | 8/2003 | Schuessler | |
| 6,605,116 B2 | 8/2003 | Falcon | |
| 6,638,308 B2 | 10/2003 | Corbitt, Jr. | |
| 6,673,285 B2 | 1/2004 | Ma | |
| 6,692,527 B1 | 2/2004 | Bellin | |
| 6,755,861 B2 | 6/2004 | Nakao | |
| 6,802,861 B1 | 10/2004 | Hamas | |
| 6,811,570 B1 | 11/2004 | Gehl | |
| 6,818,673 B2 | 11/2004 | Ferguson | |
| 6,875,233 B1 | 4/2005 | Turner | |

(56) References Cited

U.S. PATENT DOCUMENTS

| | | | |
|---|---|---|---|
| 6,881,226 B2 | 4/2005 | Corbitt, Jr. | |
| 6,900,055 B1 | 5/2005 | Fuller | |
| 6,913,626 B2 | 7/2005 | McGhan | |
| 6,916,339 B1 | 7/2005 | Missana | |
| 6,921,418 B2 | 7/2005 | Ledergerber | |
| 6,932,840 B1 | 8/2005 | Bretz | |
| 7,081,135 B2 | 7/2006 | Smith et al. | |
| 7,081,136 B1 | 7/2006 | Becker | |
| 7,105,116 B2 | 9/2006 | Bellin | |
| 7,169,180 B2 | 1/2007 | Brennan | |
| 7,192,450 B2 | 3/2007 | Brauker | |
| 7,244,270 B2 | 7/2007 | Lesh | |
| 7,323,208 B2 | 1/2008 | Ma | |
| 7,476,249 B2 | 1/2009 | Frank | |
| 7,520,896 B2 | 4/2009 | Benslimane | |
| 7,547,393 B2 | 6/2009 | Ramaswamy | |
| 7,625,405 B2 | 12/2009 | Purkait | |
| 7,632,228 B2 | 12/2009 | Brauker | |
| 7,632,291 B2 | 12/2009 | Stephens | |
| 7,641,688 B2 | 1/2010 | Lesh | |
| 7,645,475 B2 | 1/2010 | Prewett | |
| 8,070,809 B2* | 12/2011 | Schuessler | 623/8 |
| 8,202,317 B2 | 6/2012 | Becker | |
| 8,257,531 B2* | 9/2012 | Laghi | 156/145 |
| 8,313,527 B2 | 11/2012 | Powell et al. | |
| 8,487,012 B2 | 7/2013 | Goraltchouk et al. | |
| 2002/0038147 A1 | 3/2002 | Miller | |
| 2002/0193885 A1 | 12/2002 | Legeay | |
| 2003/0036803 A1 | 2/2003 | McGhan | |
| 2003/0093151 A1 | 5/2003 | Zhang | |
| 2003/0105469 A1 | 6/2003 | Karmon | |
| 2003/0205846 A1 | 11/2003 | Bellin | |
| 2003/0208269 A1 | 11/2003 | Eaton | |
| 2004/0010225 A1 | 1/2004 | Schuessler | |
| 2004/0115241 A1 | 6/2004 | Calhoun | |
| 2004/0127985 A1 | 7/2004 | Bellin | |
| 2004/0143327 A1 | 7/2004 | Ku | |
| 2004/0148024 A1* | 7/2004 | Williams | 623/8 |
| 2004/0153151 A1 | 8/2004 | Gonzales de Vicente | |
| 2004/0213986 A1 | 10/2004 | Kim | |
| 2005/0055093 A1 | 3/2005 | Brennan | |
| 2005/0070124 A1 | 3/2005 | Miller | |
| 2005/0112169 A1 | 5/2005 | Brauker | |
| 2005/0122169 A1 | 6/2005 | Watanabe | |
| 2005/0182496 A1* | 8/2005 | Hunter et al. | 623/23.72 |
| 2005/0196452 A1 | 9/2005 | Boyan et al. | |
| 2005/0216094 A1 | 9/2005 | Prewett | |
| 2005/0251083 A1 | 11/2005 | Carr-Brendel et al. | |
| 2006/0002810 A1 | 1/2006 | Grohowski | |
| 2006/0036266 A1 | 2/2006 | Sulamanidze et al. | |
| 2006/0036320 A1 | 2/2006 | Job | |
| 2006/0136056 A1 | 6/2006 | Wohl | |
| 2006/0147492 A1* | 7/2006 | Hunter et al. | 424/426 |
| 2006/0224239 A1 | 10/2006 | Tiahrt | |
| 2006/0229721 A1 | 10/2006 | Ku | |
| 2006/0235094 A1 | 10/2006 | Habibi-Naini | |
| 2006/0246121 A1 | 11/2006 | Ma | |
| 2007/0093911 A1 | 4/2007 | Fricke | |
| 2007/0104693 A1 | 5/2007 | Quijano | |
| 2007/0104695 A1 | 5/2007 | Quijano | |
| 2007/0116735 A1 | 5/2007 | Calhoun | |
| 2007/0135916 A1 | 6/2007 | Maxwell | |
| 2007/0154525 A1 | 7/2007 | Calhoun | |
| 2007/0190108 A1 | 8/2007 | Datta et al. | |
| 2007/0198085 A1 | 8/2007 | Benslimane | |
| 2007/0299043 A1* | 12/2007 | Hunter et al. | 514/171 |
| 2008/0009830 A1 | 1/2008 | Fujimoto | |
| 2008/0071371 A1 | 3/2008 | Elshout | |
| 2008/0075752 A1 | 3/2008 | Ratner | |
| 2008/0107744 A1* | 5/2008 | Chu | 424/489 |
| 2008/0154366 A1 | 6/2008 | Frank | |
| 2008/0241212 A1 | 10/2008 | Moses | |
| 2008/0246180 A1* | 10/2008 | Appleby et al. | 264/220 |
| 2008/0268019 A1 | 10/2008 | Badylak | |
| 2008/0312739 A1 | 12/2008 | Agerup | |
| 2009/0045166 A1 | 2/2009 | Li | |
| 2009/0082864 A1 | 3/2009 | Chen | |
| 2009/0087641 A1 | 4/2009 | Favis | |
| 2009/0093878 A1 | 4/2009 | Glicksman | |
| 2009/0118829 A1 | 5/2009 | Powell et al. | |
| 2009/0125107 A1 | 5/2009 | Maxwell | |
| 2009/0169716 A1 | 7/2009 | Linhardt | |
| 2009/0198331 A1 | 8/2009 | Kesten et al. | |
| 2009/0198332 A1 | 8/2009 | Becker | |
| 2009/0198333 A1 | 8/2009 | Becker | |
| 2010/0042211 A1 | 2/2010 | Van Epps et al. | |
| 2010/0042212 A1 | 2/2010 | Van Epps et al. | |
| 2010/0209471 A1* | 8/2010 | Weber | 424/423 |
| 2010/0226943 A1* | 9/2010 | Brennan et al. | 424/400 |
| 2010/0228347 A1* | 9/2010 | Schuessler | 623/8 |
| 2010/0241214 A1* | 9/2010 | Holzer et al. | 623/1.15 |
| 2010/0292790 A1 | 11/2010 | Stroumpoulis et al. | |
| 2011/0054605 A1 | 3/2011 | Becker | |
| 2011/0093069 A1 | 4/2011 | Goraltchouk et al. | |
| 2011/0106249 A1 | 5/2011 | Becker | |
| 2011/0117267 A1 | 5/2011 | Powell et al. | |
| 2011/0196488 A1 | 8/2011 | Goraltchouk et al. | |
| 2011/0196489 A1 | 8/2011 | Van Epps et al. | |
| 2011/0276133 A1 | 11/2011 | Liu et al. | |
| 2011/0276134 A1 | 11/2011 | Manesis et al. | |
| 2011/0278755 A1 | 11/2011 | Liu et al. | |
| 2011/0282444 A1 | 11/2011 | Liu et al. | |
| 2011/0309541 A1 | 12/2011 | Thompson et al. | |
| 2012/0004722 A1 | 1/2012 | Goraltchouk et al. | |
| 2012/0041555 A1 | 2/2012 | Manesis et al. | |
| 2012/0077010 A1 | 3/2012 | Manesis et al. | |
| 2012/0077012 A1 | 3/2012 | Liu et al. | |
| 2012/0077891 A1 | 3/2012 | Liu et al. | |
| 2012/0101574 A1 | 4/2012 | Goraltchouk et al. | |
| 2012/0142798 A1 | 6/2012 | Thompson et al. | |
| 2012/0245685 A1 | 9/2012 | Yu | |
| 2012/0321777 A1 | 12/2012 | Stroumpoulis et al. | |
| 2013/0013062 A1 | 1/2013 | Thompson et al. | |
| 2013/0023987 A1 | 1/2013 | Liu et al. | |
| 2013/0032962 A1 | 2/2013 | Liu et al. | |
| 2013/0053956 A1 | 2/2013 | Powell et al. | |
| 2013/0158657 A1 | 6/2013 | Nofrey et al. | |

FOREIGN PATENT DOCUMENTS

| | | |
|---|---|---|
| EP | 0522585 | 1/1993 |
| EP | 1532942 | 5/2005 |
| FR | 2840617 | 12/2003 |
| JP | 2003-062062 | 4/2003 |
| JP | 2007-029717 | 8/2007 |
| WO | WO 98/10803 | 3/1998 |
| WO | WO 00/24437 | 5/2000 |
| WO | WO 2004/037318 | 5/2004 |
| WO | WO 2004/062531 | 7/2004 |
| WO | 2006/133366 | 12/2006 |
| WO | WO 2009/061672 | 5/2009 |
| WO | WO 2009/110917 | 9/2009 |
| WO | WO 2011/094155 | 8/2011 |
| WO | WO 2011/097499 | 8/2011 |

OTHER PUBLICATIONS

Alvarez, Sonia et al., "Synthesis of Macro/Mesoporous Silica and Carbon Monoliths by Using a Commercial Polyurethane Foam as Sacrificial Template", Materials Letters, 61, 2378-2381 (2007).

Barr, S. et al., "Current Implant Surface Technology: An Examination of Their Nanostructure and Their Influence on Fibroblast Alignment and Biocompatibility", Elastic, 2009, 9, 198-217.

Barnsley, Philip et al., "Textured Surface Breast Implants in the Prevention of Capsular Contracture Among Breast Augmentation Patients: A Meta-Analysis of Randomized Controlled Trials", Plastic and Reconstructive Surgery, 2006, 117(7), 2182-2190.

Inamed Aesthetics Brochure, Directions for Use Style 410 Silicone-Filled Breast Implants (2003).

Ma, Peter, "Scaffolds for tissue fabrication", Materials Today, 2004, 7, 30-40.

(56) References Cited

OTHER PUBLICATIONS

Mikes, Antonius et al., "Formation of Highly Porous Biodegradable Scaffolds for Tissue Engineering", Electronic Journal of Biotechnology, 2000, 3(2), 114-119.

Minami, Eliza et al., "The Composition and Behavior of Capsules Around Smooth and Textured Breast Implants in Pigs", Plastic and Reconstructive Surgery, 2006, 118940, 874-884.

Murphy, William et al., "Salt Fusion: An Approach to Improve Pore Interconnectivity Within Tissue Engineering Scaffolds", Tissue Engineering, vol. 8, Iss. 1, 2004.

Wei, Guobao et al., "Macroporous and Nanofibers Polymer Scaffolds and Polymer/bone-like Apatite Composite Scaffolds Generated by Sugar Spheres", Journal of Biomedical Materials Research Part A, 2006, 306-315.

Zhang, Yuan et al., "Macroporous Alumina Monoliths Prepared by Filling Polymer Foams With Alumina Hydrosols", J. Mater Sci., 44, 931-938 (2009).

Brauker et al., "Neovascularization of synthetic membranes directed by membrane microarchitecture", Journal of Biomedical Materials Research, 1995, pp. 1517-1524, vol. 29, John Wiley & Sons, Inc.

Brohim et al., "Early Tissue Reaction to Textured Breast Implant Surfaces", Anals of Plastic Surgery, 28(4): 354-362.

Sharkawy et al. "Engineering the tissue which encapsulates subcutaneous implants", II. Plasma—tissue exchange properties, 1998, pp. 586-597, John Wiley & Sons, Inc.

\* cited by examiner

FOAM-LIKE MATERIALS AND METHODS FOR PRODUCING SAME

RELATED APPLICATIONS

This application claims the benefit of and priority to U.S. Provisional Patent Applications Nos. 61/328,358, filed on Apr. 27, 2010 and 61/329,518, filed on Apr. 29, 2010, the entire disclosure of each of these applications being incorporated herein by this specific reference.

The present invention generally relates to foam-like materials suitable for various industrial and general purpose applications.

BACKGROUND

General purpose foams have conventionally been manufactured from polyurethane. Polyurethane foams are widely used in industrial applications and everyday life. The porous geometry of polyurethane foams makes them ideal candidates as the geometry result in both strong and flexible material. Example uses include high resiliency flexible foam seating, rigid foam insulation panels, microcellular foam seals, and carpet underlay.

However, foams made substantially of polyurethane generally have very low acid and base resistance, swell readily in a large range of solvents (N-methylpyrrolidone, dimethyl sulfoxide, ethyl acetate, methyl ethyl ketone, dichloromethane, and swell somewhat in an even broader range of solvents (xylene, hexane, dioxane, acetone) depending on its formulation. Additionally, polyurethane foams generally have a low resistance to oxidation and ultraviolet light (UV), are not degradable in a controlled manner, and are not readily made environmentally friendly (quickly break down into unsafe components).

Such properties make them less than ideal for many general purpose applications for which substantially opposite properties are desired. All of these properties have an impact on performance range, for example use in filtration with solvents, use in filtration with acids and bases, use in insulation with solvents, acids, and bases, use in oxidative environments, use in environments with metal salts, use in environments with high UV or radiation exposure, hydrolytic degradation in cushioning, and the like.

As such, there is a need in the art for general purpose foams with the broad applications of commonly used porous polyurethane foam materials but without the drawbacks described above.

U.S. patent application Ser. No. 13/015,309, filed on Jan. 27, 2011 discloses novel methods for making materials suitable for implantation in a mammal, the methods including the steps of providing a base material having a desirable surface topography, such as a polyurethane foam, contacting the base member with a silicone-based fluid material to form a coating, and allowing the coating to set to form a silicone-based structure suitable for implantation in a mammal. The entire disclosure of this application is incorporated herein in its entirety by this specific reference.

The present invention provides novel foam-like materials and methods of making the same.

SUMMARY

Described herein are methods of making foam-like materials having one or more physical characteristics, such as topography, porosity, shape, substantially identical to conventional foam materials, for example, substantially identical to a polyurethane foam. The present foam like materials are made from and comprise materials that are different from conventional foams, and with properties that can be tailored for particular applications. The foam-like materials described herein can have useful properties such as making them suitable as or in filtration systems, as or in insulation, as a composite member in an oxidative environment, as a composite member in an environment with a high UV or radiation flux, as a hydrolytic degradation means in cushioning, and the like.

Also described herein are methods of making foam-like materials having at least one property described above. The first step in the method is providing a base material having a porous surface. Then, the base material is contacted with a first fluid material in a manner causing the first fluid material to enter the porous surface. As an optional step, at least a portion of the first fluid material is removed resulting in a desired porosity. The first fluid material is then cured within the porous surface of the base material forming a cured first fluid material with the desired porosity. At least a portion of the base material is then removed thereby leaving a foam-like material comprising the cured first fluid material having a textured surface substantially identically conforming to the surface of the base material.

Also disclosed are materials and compositions made by the steps described herein.

In some embodiments, the removing step is accomplished using a vacuum to draw the fluid into the porous surface, using pressurized air, using an airknife to blow away excess fluid material, pressing the base material to squeeze out excess fluid material or a combination of those procedures.

The base materials described herein have properties which depend on the desired resultant foam-like material properties. In one embodiment, the base material has a thickness between about 10 μm and about 3 mm. In other embodiments, the base material has a thickness of up to about 3 m.

The base material can also be made of a material which is removable from the cured first fluid material without substantially causing a change in the microstructure and/or macrostructure thereof. In other embodiments, the base material is a foam made from at least one material selected from the group consisting of polyethylene, polyethylene vinyl acetate, polystyrene, polyvinyl alcohol, Styrofoam, a polyolefin, polyester, polyether, polysaccharide, polyamide, polyacrylate, a material which contains aromatic or aliphatic structures in the backbone, as functionalities, cross-linkers or pendant groups, a copolymer thereof, a terpolymer thereof, a quarternaly polymer thereof, a metal, a metal foam, a ceramic, a ceramic foam, and combinations thereof. In one embodiment, the base material is removed by dissolution, degradation or a combination thereof.

In another embodiment, the fluid material is a homogenous liquid, dispersion, solution, emulsion, or a combination thereof. The fluid material is contacted to the base material in such a manner as to deposit a conformal coat unto the porous surface which can have a thickness of about 1 μm to about 3000 μm.

The foam-like materials described herein generally can be substantially non-degradable. In example embodiments, the foam-like materials are non-degradable under at least one condition selected from radiation, UV light, in an environment with metal slats, basic conditions, acidic conditions or a combination thereof.

In some embodiments, the contacting step coats the base material with the first fluid material and can fill about 0.001% to about 100% of the voids in the base material with the first fluid material.

In still other embodiments, the removing step removes about 5% to about 100% of the base material from the cured first fluid material. In another embodiment, the removing step removes substantially all of the base material from the cured first fluid material. The removing step can be repeated one or more times. Further, in one embodiment, the removing step comprises contacting the base material with a solution, mixture suspension, emulsion, dispersion or combination thereof capable of dissolving the base material and/or comprises degradation or dissolution of the base material with a base, a solvent, an enzyme, an acid, heat, oxidation, ultraviolet light, gamma irradiation, visible light, infrared light or a combination thereof.

In another embodiment, the method further comprises at least a second contacting step wherein the foam-like material is contacted with at least one additional fluid material wherein the at least one additional fluid material coats the foam-like material. The method can further comprise at least a second curing step wherein at least one additional fluid material is allowed to cure on the foam-like material thereby forming a processed foam-like material. In other embodiments the at least one additional fluid material and the first fluid material are the same or are different.

In still another embodiment, the second contacting step allows the second fluid material to fill areas wherein the base material had been removed. The second contacting step can allow the second fluid material to about 0.001% to about 100% of the area wherein the base material has been removed.

The second fluid material, in one embodiment, is selected from the group consisting of a polyolefin, a polyester, a polyether, a polycarbonate, a polyamide, a polyamine, a polyacrylate, a halogenated polymer, a metal, copolymers thereof and blends thereof.

In some embodiments, the method further comprises the step of curing the at least one additional fluid material and removing the foam-like material resulting in a post processed foam-like material. In another embodiment, about 5% to about 100% of the foam-like material is removed.

BRIEF DESCRIPTION OF THE DRAWINGS

FIG. 1 is an SEM micrograph of a implantable material made in accordance with a method of the invention; and.

DETAILED DESCRIPTION

Figure 1:
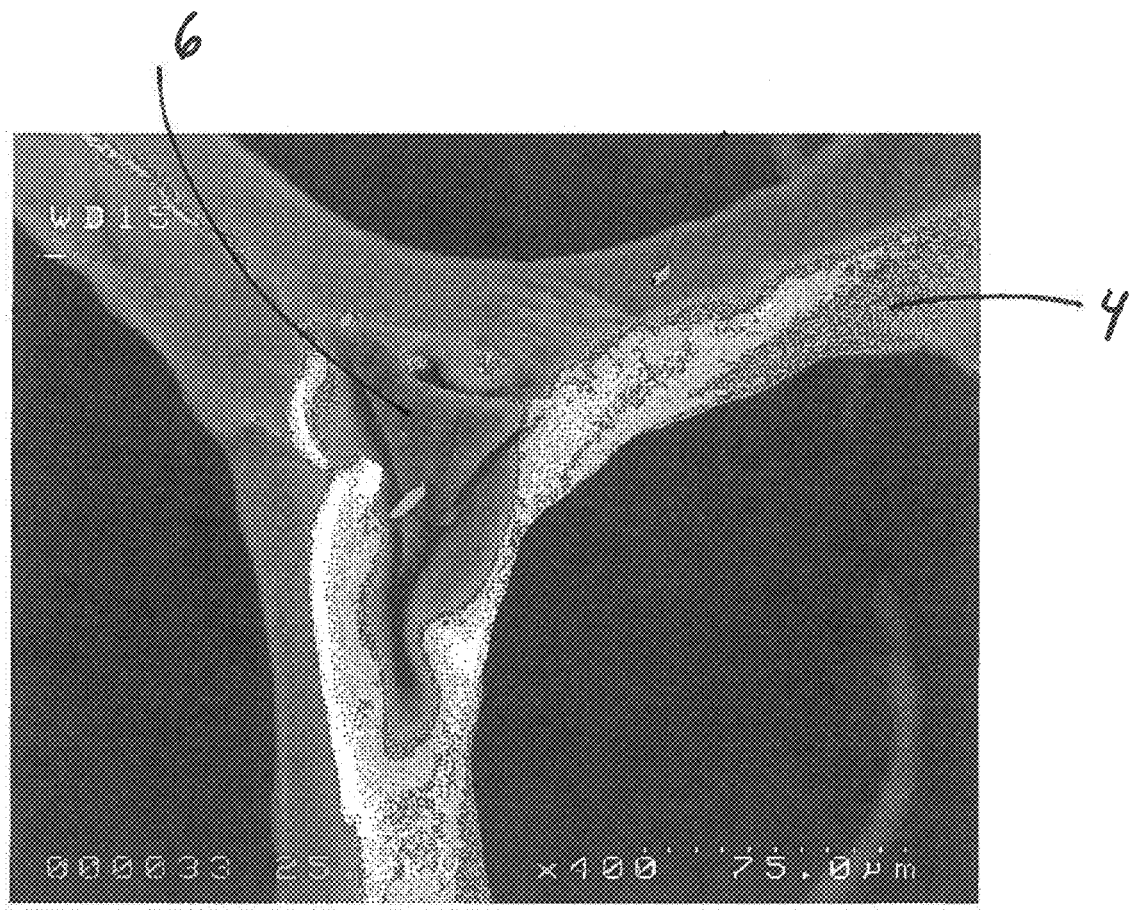

Described herein generally are foam-like materials useful for industrial applications as well as having everyday applicability. The foam-like materials have substantially the same physical structure of polyurethane foams but with properties that can be tailored for a particular application whether it be industrial, medical, recreational, or the like. In other words, materials other than polyurethane, or in addition to polyurethane, can be used to form foam-like materials having a substantially similar structure to polyurethane foams but with the properties of the materials used. Methods of forming these foam-like materials are also described.

The foam-like materials can have a reticulated structure similar to one that can be made out of a polyurethane, which is highly controllable anywhere from 5 PPI to 500 PPI with an open cell structure. The foam-like structures described herein can be further controllable from about 1 PPI to about 1000 PPI.

The foam-like materials may be used as coverings or outer layers for virtually any application or article of manufacture. Applications can range from solvent filtration systems to cushioning in outdoor furniture with high exposure to sunlight.

The foam-like materials can be substantially inert and/or substantially non-degradable, even under radiation, UV light, in an environment with metal slats, acidic or basic conditions, oxidative conditions, combinations thereof and the like. The foam like materials have structures, for example, a microstructure, similar or substantially identical to that of a base material from which it is molded. The base material may be, or may not be, a degradable material and preferably has at least a porous surface.

For example, a method for making a foam-like material in accordance with one embodiment comprises the steps of providing a base material including a porous surface, generally defined by interconnected pores, and contacting the base material with a first fluid material in a manner causing the first fluid material to enter the porous surface. At that point, a vacuum or other means may be applied to the base material in order to facilitate the contacting step. Excess first fluid material may be removed from the base material to obtain a coating of the first fluid material on and through the porous surface with a desired porosity.

In some embodiments, the first fluid material is contacted to the base material in such a manner as to deposit a conformal coat unto the porous surface of the base material. The conformal coating can have a thickness of about 1 μm to about 3000 μm, about 10 μm to about 500 μm or about 50 μm to about 100 μm. The fluid materials, in some embodiments, substantially fill or completely fill the porous surface of the base material. In other embodiments, the void space in the porous base material surface is filled to about 0.001% to about 100%, about 0.01% to about 75%, or about 0.1% to about 50% and about +/−0.7% to about 60% by standard deviation.

The first fluid material is then allowed to cure, forming a cured first fluid material coated on and within the porous surface of the base material having the desired porosity. The contacting step may be repeated once, twice, three or more times, for example, up to 1000 times, until a desired thickness and/or final density is achieved.

The first fluid material can be coated on the base material thereby substantially conforming to the structure of the base material. Also, the first fluid material can be contacted with the base material in such a manner that the first fluid material substantially fills the void space of the base material's porous surface, thereby assuming a textured surface substantially opposite the base material. Either method is within the scope of the present disclosure.

The underlying base material may then be removed from the cured first fluid material. For example, the base material is contacted with a solution, mixture, suspension, emulsion, dispersion or combination thereof containing a dissolvent or a degradant. Other removal methods include degradation by a base or an acid, application of heat, application of at least one form of energy such as ultraviolet light, gamma rays or irradiation, visible light or infrared light, application of an appropriate solvent, application of an enzyme for enzymatic degradation and combinations thereof. The base material can be removed by dissolution, degradation or both. Once the base material is removed, the resulting foam-like material is flexible and includes a porous surface substantially identically conforming to the porous surface and/or interconnected spheres of the base material.

The removal can eliminate substantially all of the base material or a portion thereof. For example, in some embodiments, about 5% to about 100% of the base material is removed. In other embodiments, about 50%, about 60%, about 70%, about 80%, about 90% or more of the base material is removed. The base material can be removed in more than one step. For example, about 50% of the base material can be removed in a first step and about 50% in a second removal step. Or, about 50% in the first step, about 30% in the second step and about 20% in the third step. The number of steps involved and the amount of base material ultimately removed is dependent on, for example, the ultimate utility of the foam-like material, the base material used, the fluid materials used and the processing specifications (e.g., temperature, pressure, etc).

In some embodiments, the base material need not be removed. Rather, the first fluid material, and any additional fluid materials, is cured onto the porous base material and the base material can serve as support for the foam-like materials described herein. In other embodiments, the base material may aid in providing a desired property for the foam-like material.

Following removal of the base material, the foam-like material may be optionally further coated with a second fluid material. The second fluid material may be the same as or different than the first fluid material. The second fluid material is applied to the foam-like material can be assisted by a vacuum and may be repeated once, twice, three or more times, for example, up to 1000 times, until a desired thickness and/or final density is achieved.

In some embodiments, coating with a second fluid material serves to fill the voids in the foam-like material wherein the base material was removed. Further, the second fluid material can fill any other cracks or voids in the foam-like material making it stronger. By further coating the foam-like material with a second fluid material, a processed foam-like material is formed.

In some embodiments, the second fluid like material, much like the first fluid material, is contacted in such a manner as to deposit a conformal coat. The conformal coating can have a thickness of about 1 μm to about 3000 μm, about 10 μm to about 500 μm or about 50 μm to about 100 μm. The second fluid material, in some embodiments, substantially fills or completely fills voids within the cured first fluid material. The void space within the cured first fluid material is filled to about 0.001% to about 100%, about 0.01% to about 75%, or about 0.1% to about 50% and about +/−0.7% to about 60% by standard deviation.

Optionally, the cured first fluid material can be removed post curing of the second fluid material. The removal can be of a similar method to removing the base material as described herein. The removal can eliminate substantially all of the cured first fluid material or a portion thereof. For example, in some embodiments, about 5% to about 100% of the cured first fluid material is removed. In other embodiments, about 50%, about 60%, about 70%, about 80%, about 90% or more of the cured first fluid material is removed. The cured first fluid material can be removed in more than one step. For example, about 50% of the cured first fluid material can be removed in a first step and about 50% in a second removal step. Or, about 50% in the first step, about 30% in the second step and about 20% in the third step. The number of steps involved and the amount of cured first fluid material ultimately removed is dependent on, for example, the desired properties of the foam-like material, the base material used, other fluid materials used and the processing specifications.

The base material as described herein can be any material capable of being removed from the foam-like material upon completion thereof without substantially degrading or interrupting the structure of the foam-like material. Removal of the base material should not substantially cause a change in the microstructure and/or macrostructure of the newly curried material.

The base material can be biodegradable, resorbable or both. In other embodiments, the base material is not removed at all or is not completely removed from the final foam-like structure.

In one example embodiment, the base material is polyurethane. However, the base material may comprise any suitable porous material having the desired porous surface structure. In a specific embodiment, the implantable materials are substantially entirely comprised of silicone yet have the topographical structure of a polyurethane foam. For example, a material in accordance with one embodiment is a flexible, soft, silicone-based foam having substantially the same or substantially identical geometry and tissue disorganization potential of a polyurethane foam, but with the chemical inertness of a silicone. FIG. 1 is an SEM image of a polyurethane foam strut 4 coated with silicone elastomer 6, in accordance with an embodiment of the invention.

Figure 2:
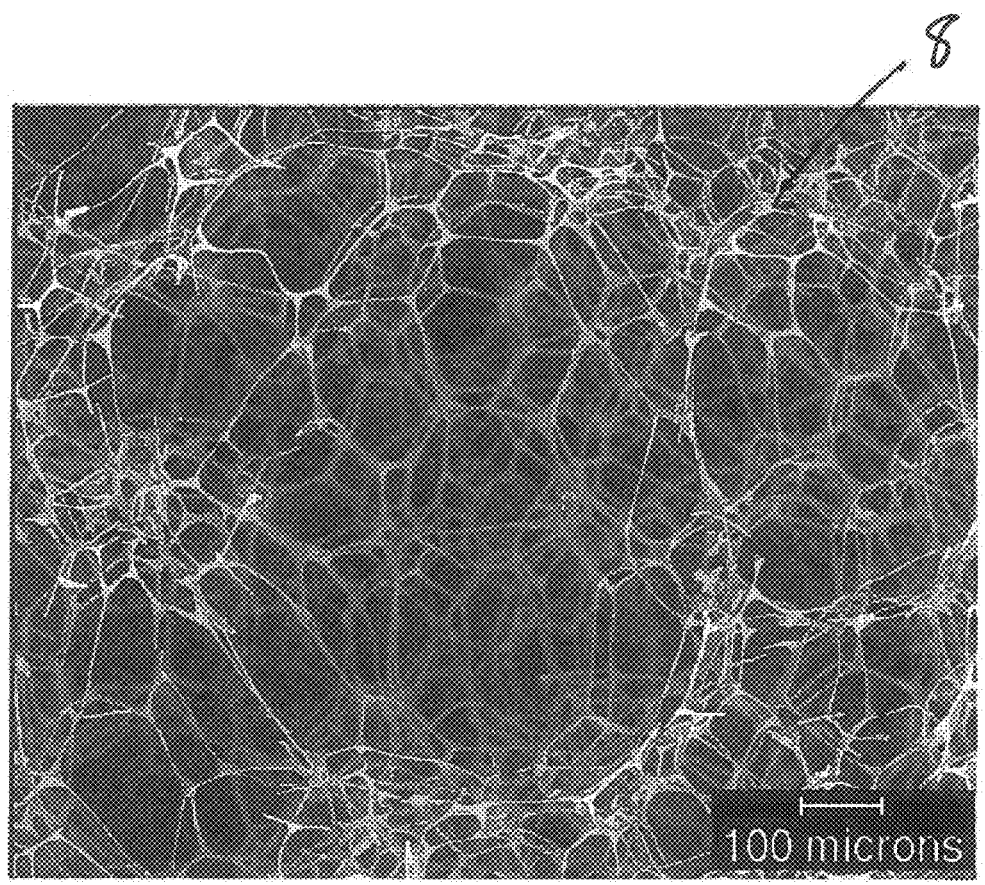
FIG. 2 is an SEM micrograph of a melamine foam which can be used as a base member in accordance with a method of the invention.

Alternative to polyurethane, the base material may comprise melamine, for example, melamine foam. FIG. 2 is an SEM micrograph of a melamine foam 8 having a topography defined by highly interconnected, open pores. Other base member materials useful are also contemplated and include, for example, foams made from polyethylene, polyethylene vinyl acetate, polystyrene, polyvinyl alcohol, Styrofoam, or generally a polyolefin, polyester, polyether, polysaccharide, polyamide, polyacrylate, a material which contains aromatic or aliphatic structures in the backbone, as functionalities, cross-linkers or pendant groups, or a copolymer, terpolymer or quarternaly polymer, thereof. Alternatively the material may be a composite of one or more of the aforementioned materials. In another embodiment of the invention the base material can be a metal, for example a metal foam, a ceramic, or a composite material.

It is to be appreciated that for a base material other than polyurethane, said base material can be removed by a solvent or other means, known to those of skill in the art, suitable for removing the base material from the coating without substantially altering or affecting the coating structure.

The base material itself has a thickness of at least about 10 μm to about 3 millimeters. It is contemplated that the base material may have a thickness of up to 3 meters. The thickness of the base material can be selected based on factors including, for example, the viscosity of the fluid material(s) used, the foam-like material being produced, and manufacturing properties. For example, if a foam-like material is being made as a coating for an implantable medical device, base materials between about 10 μm and about 1 cm can be used. Alternatively, if for example seating cushions are being created, the base materials can be from about 5 cm to about 3 m thick. A 3 m thick cushion material can be cut to a desired size during manufacture and the thicker starting foam can potentially save on manufacturing costs.

The base material can have varying pores sizes depending on the application of the eventual foam-like materials to be generated based on the interconnected pores of the base member. The base materials described herein can have a pore size of about 100 µm to about 1000 µm (RSD=0.01%-100%), or about 300 µm to about 700 µm (RSD=1%-40%). In one example embodiment, the pore size is about 475 µm.

The base materials can also have characteristic interconnection sizes. The interconnection size can range from about 30 µm to about 700 µm (RSD=0.01%-100%), or about 100 µm to about 300 µm (RSD=1%-40%). In one example embodiment, the interconnection size is about 200 µm. The number of interconnections per pore is generally about 2 to about 20 (RSD=0.01%-50%), or about 3 to about 10 (RSD=1%-25%). In one example embodiment, there are about 9 to 10 interconnections per pore. Further, the base materials can have an average pore to interconnection size ratio. In one embodiment, this ratio is about 3% to about 99%, or about 10% to about 99%. In one example embodiment, the average pore to interconnection size ratio is about 44%.

Figure 3:
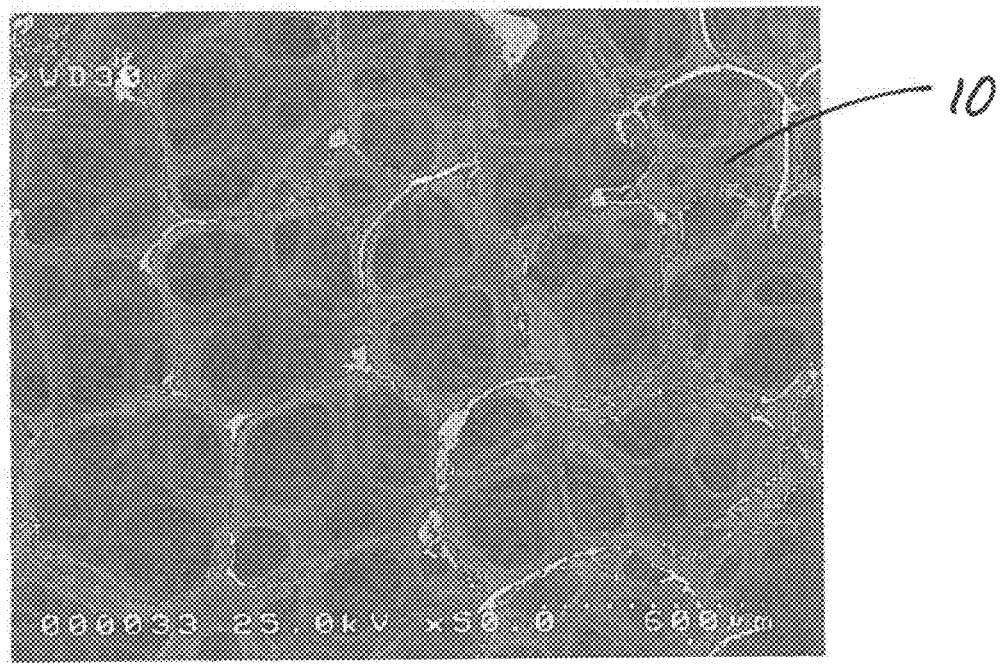
FIGS. 3-9 are images of other materials that can be useful as base materials in accordance with different embodiments of the invention.
Figure 4:
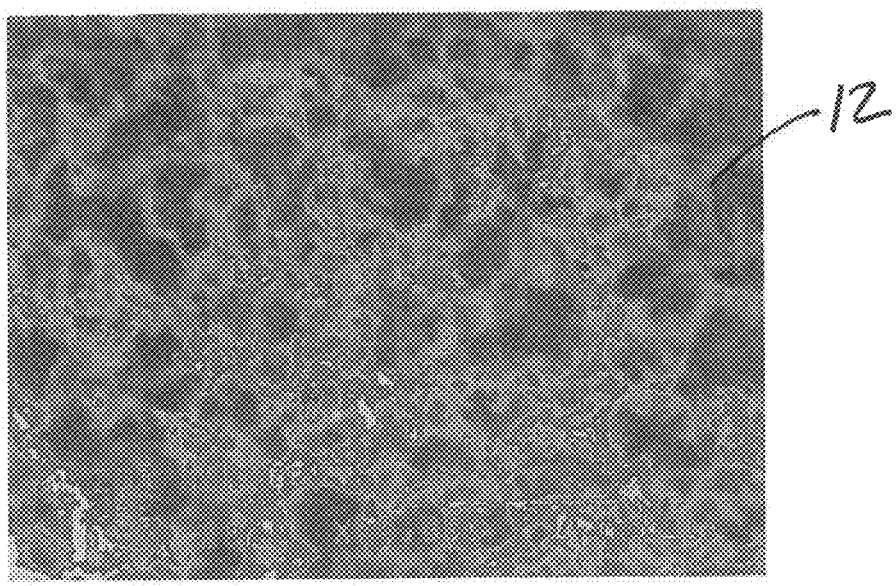
Figure 5:
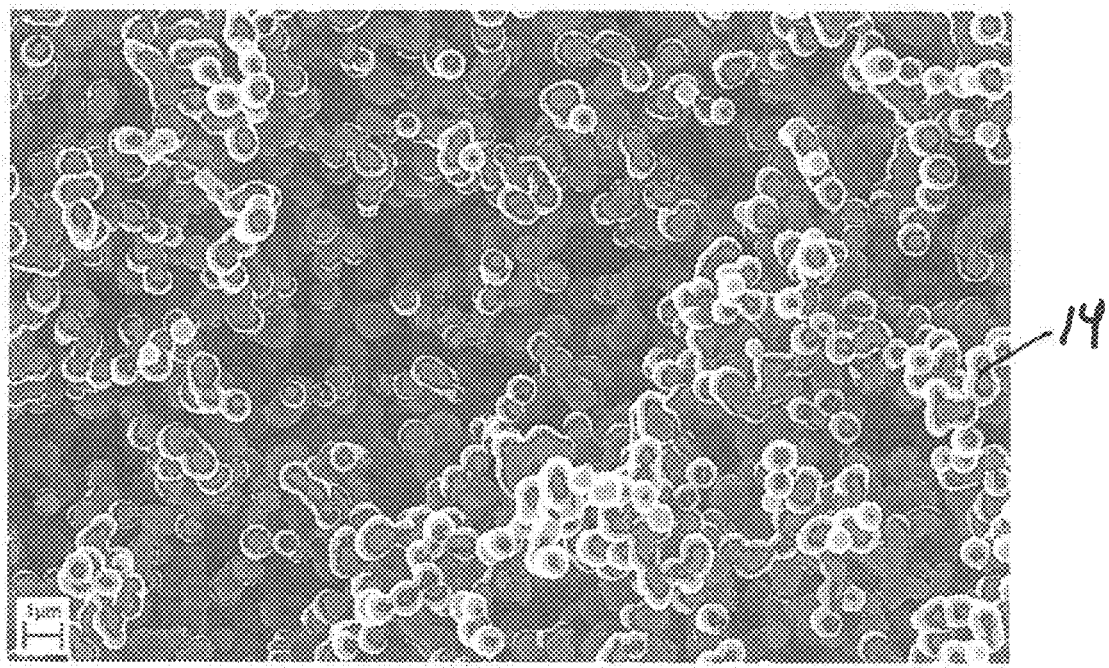
Figure 6:
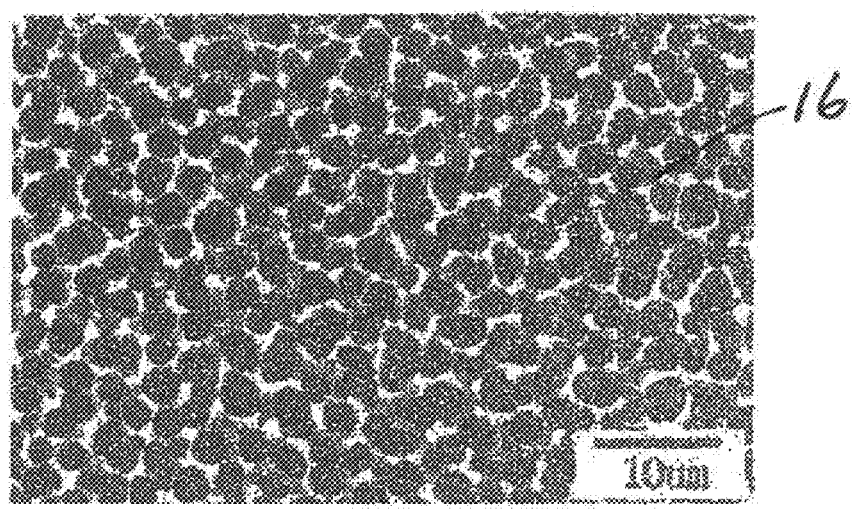
Figure 7:
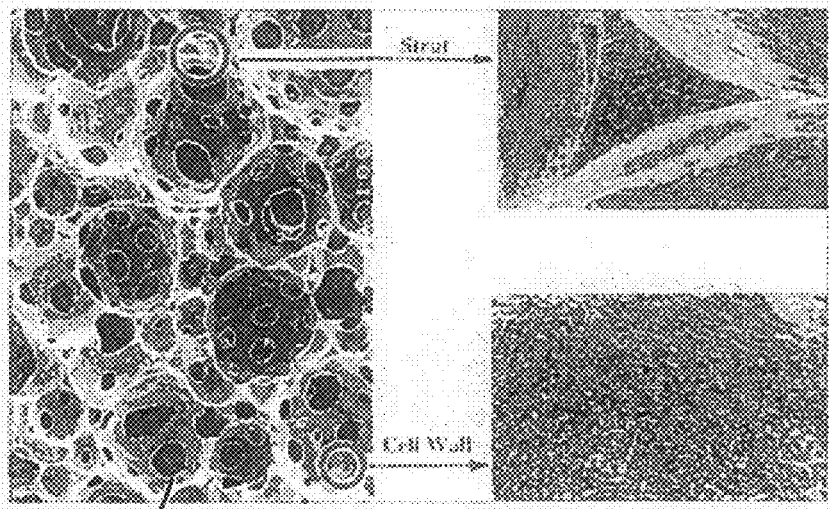
Figure 8:
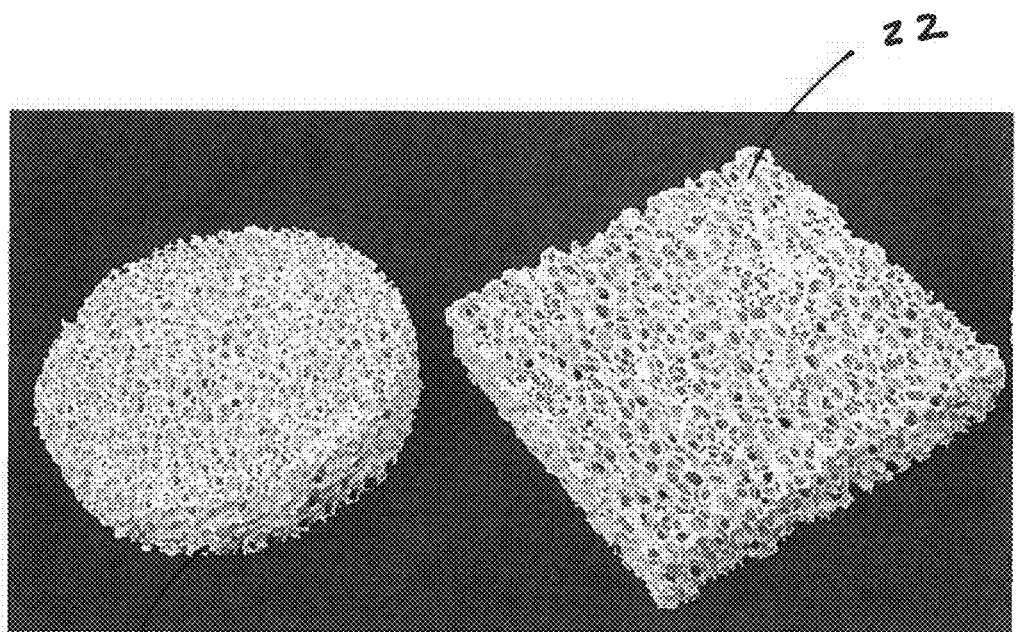
Figure 9:
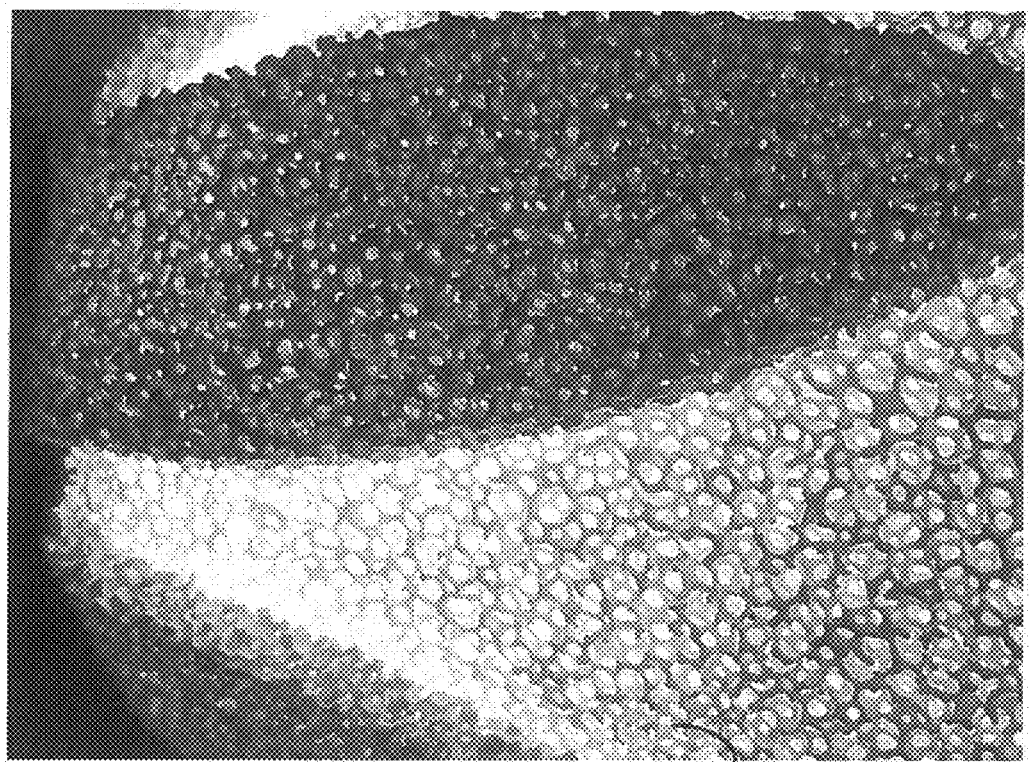

Porous surfaces of base member materials useful in accordance with various embodiments of the invention are shown in FIGS. 3-9. More specifically, FIG. 3 is a SEM image of a polyurethane foam base 10; FIG. 4 is an alumina aerogel foam 12; FIG. 5 is another aerogel, for example, silica aerogel foam 14; FIG. 6 is a silica foam 16; FIG. 7 is a HiP foam 18; FIG. 8 is a magnesium ceramic foam 22; and FIG. 9 is another ceramic foam The fluid materials described herein can include polymers that are relatively stable such as polyurethanes, silicones, polyesters, polyolefins, polyisobutylene, ethylene-alphaolefin copolymers, acrylic polymers and copolymers, ethylene-co-vinylacetate, polybutylmethacrylate, vinyl halide polymers and copolymers (e.g., polyvinyl chloride), polyvinyl ethers (e.g., polyvinyl methyl ether), polyvinylidene halides (e.g., polyvinylidene fluoride and polyvinylidene chloride), polyacrylonitrile, polyvinyl ketones, polyvinyl aromatics (e.g., polystyrene), polyvinyl esters (e.g., polyvinyl acetate), copolymers of vinyl monomers with each other and olefins (e.g., ethylene-methyl methacrylate copolymers, acrylonitrile-styrene copolymers, ABS resins, and ethylene-vinyl acetate copolymers), polyamides (e.g., Nylon 66 and polycaprolactam), alkyd resins, polycarbonates, polyoxymethylenes, polyimides, polyethers, epoxy resins, polyurethanes; rayon, rayon-triacetate, cellulose, cellulose acetate, cellulose butyrate, cellulose acetate butyrate, cellophane, cellulose nitrate, cellulose propionate, cellulose ethers, carboxymethyl cellulose, and combinations thereof.

The fluid materials described herein can also include polymers that are degradable, in some cases biodegradable or bioerodable, such as, but not limited to poly(L-lactic acid), polycaprolactone, poly(lactide-co-glycolide), poly(ethylene-vinyl acetate), poly(hydroxybutyrate-co-valerate), polydioxanone, polyorthoester, polyanhydride, poly(glycolic acid), poly(D,L-lactic acid), poly(glycolic acid-co-trimethylene carbonate), polyphosphoester, polyphosphoester urethane, poly(amino acids), cyanoacrylates, poly(trimethylene carbonate), poly(iminocarbonate), copoly(ether-esters) (e.g., PEO/PLA), polyalkylene oxalates, polyphosphazenes and biomolecules such as fibrin, fibrinogen, cellulose, starch, collagen, hyaluronic acid and combinations thereof.

In one embodiment, the fluid materials cans each independently be selected from a non-network, non cross-linked, polyolefin, polyester, polyether, polycarbonate, polyamide, polyamine, polyacrylate, a halogenated polymer (e.g., PTFE), and the like, copolymer blends or other combinations thereof. Other polymers include those with melting points and/or flowable polymers (e.g., amorphous polymers can be flowable, but not exhibit a melting point). In another embodiment, the fluid material may comprise a dispersion, for example, a silicone dispersion. The silicone dispersion may be a room temperature vulcanizing (RTV) or a high temperature vulcanizing (HTV) silicone. In an exemplary embodiment, the fluid material is a high temperature vulcanizing (HTV) platinum-cured silicone dispersion in xylene or chloroform.

Fluid materials can be in a form such as, but not limited to solutions, emulsions, suspensions or combinations thereof. Also, for example, any material that can be cured by crosslinking, thermoplastics that set by change in temperature, material that set by removal of solvents or any elastomer that cures or sets by any known mechanism, can be used. It is further contemplated that suitable metals can be used as fluid materials. For example, aluminum, steel, silver, copper, and titanium are common metals that can be foamed.

The type of fluid material forming applied on and into the pores and/or interconnections of the base material, the total dissolved solids of the fluid material, the method of removing the excess fluid material, the carrier solvent, the method of applying the fluid material, the temperature of materials, can be varied in accordance with different embodiments of the present description to achieve a foam-like material with a particular set of properties. Other combinations can be easily envisioned by one skilled in the art.

In some embodiments, the base material is coated with multiple layers of different first fluid materials; up to and exceeding 20 different fluid materials can be used. Different composite materials can be formed with various mixtures of coating layers. For example, a first fluid material may comprise a barrier layer of a material capable of reducing or preventing diffusion of chemical substances from the base material, and an additional first fluid material applied on top of the first fluid material may comprise a silicone-based material. Other first fluid materials may be selected to achieve various characteristics of the final product, such as materials to strengthen the foam-like material, prevent chemical degradation, and/or change surface properties. In other embodiments, the same fluid material can be used to coat a base material up to and exceeding 20 times, or even 1,000 times.

In yet another embodiment, a method of making a material is provided which generally comprises providing a base material comprising a degradable foam and including a porous surface defined by interconnected pores, and coating the base material with a substantially non-degradable polymeric material, fluid material, to obtain a substantially non-biodegradable polymeric structure. For example, the base material may comprise a polyurethane foam. The substantially non-degradable polymeric material can be selected from a list of highly impermeable systems such as fluorinated polyolefins to prevent diffusion of chemical entities which may facilitate the degradation of polyurethane. Alternatively the fluorinated polyolefin can be coated as a base layer, prior to the final application of the silicone to act as a barrier layer.

In still another embodiment, the base material of a preferred geometry, that is not dissolvable (e.g., a cross-linked polymer having a porous surface) may be coated by a robust but dissolvable material, such as, for example, a foam material selected from the group of materials consisting of polystyrene, polyethylene-co-vinyl acetate, and poly(styrene-co-butadiene-co-styrene). The base material, e.g. the non-dissolvable foam, can then be removed from the dissolvable material coating, for example, degraded by relatively aggressive means, for example, by acid digestion in 37% HCl, leaving the robust but dissolvable material behind. A silicone-based fluid material, for example, is deposited on the robust but dissolvable foam, for example, using the methods described elsewhere herein. The silicone-based fluid material may be in the form of a dispersion having a solvent system that does not dissolve the robust polymer. The silicone is allowed to set and/or cure, and the robust material is then dissolved out by means which does not affect the material of interest (e.g. silicone), for example, by dissolution in acetone in the case of polystyrene. In this case, the material of interest is not subjected to aggressive conditions used to dissolve the original foam.

In one exemplary embodiment, the base material comprises a material, for example, polyurethane or other suitable material, having a pore size of 472+/−61 µm (RSD=13%), interconnection size: 206+/−60 µm (RSD=29%), interconnections per pore: 9.6+/−1.8 (RSD=19%), Pore to interconnection size ratio of 44%.

An example embodiment, includes coating a polyurethane base material with a fluoropolymer like PVDF at 20% wt. in HFIP, then acid leaching the polyurethane followed by a DMSO wash to remove excess, then coating with silicone some of which can be damaged by the acid leaching process, cross-linking the silicone and leaching out the PVDF with HFIP unaffecting the silicone.

Foams as described herein can be useful as a flexible foam used in furniture cushions, pillows, mattresses, padded dashboards, run flat tire fillings, packaging material, upholstery, bedding, and automotive seating, insulation panels, microcellular foam seals and gaskets, durable elastomeric materials, automotive suspension bushings, electrical potting compounds, seals, gaskets, and carpet underlay.

Rigid foams are also within the scope of the present description and can be used for thermal insulation such as in household refrigerators and freezers, cold-storage rooms and buildings, foil-faced rigid foam boards for construction, stressed-skin panels for construction, refrigerated truck bodies, food and drink coolers, spray flat-roof systems and transfer molding cores.

Foams can also be in the form of soft elastomers used for gel pads and print rollers, air filtration parts and in footwear. Foams as described herein can also be formed as hard plastics and moldings used in electronic instrument bezels, structural parts, wheels for heavy machinery, skateboards, inline skates, wheelchairs and the like, car parts such as steering wheels and fenders, surfboards, boat hulls, flooring material, door frames, columns, balusters, window headers, pediments, medallions, rosettes, imitation wood furniture and windmill and airplane wings.

Flexible plastic foams are also within the scope of the present description and can be used as straps and bands such a tennis grips and watch bands, waterproof and windproof properties in outerwear, diapers, shower curtains and inflatable rafts.

The foams described herein can be used in a variety of medical uses such as wound dressings, implantable medical devices, dermal fillers, artificial bones, surgical tools and instruments, artificial joints, and the like. Further, they can be useful in general surgery as tapes, postmammoplasty supports, as facial and postrhytidectomy dressings, over leg grafts, postpilonidal pad dressings and axillary pad dressings.

Figure 10:
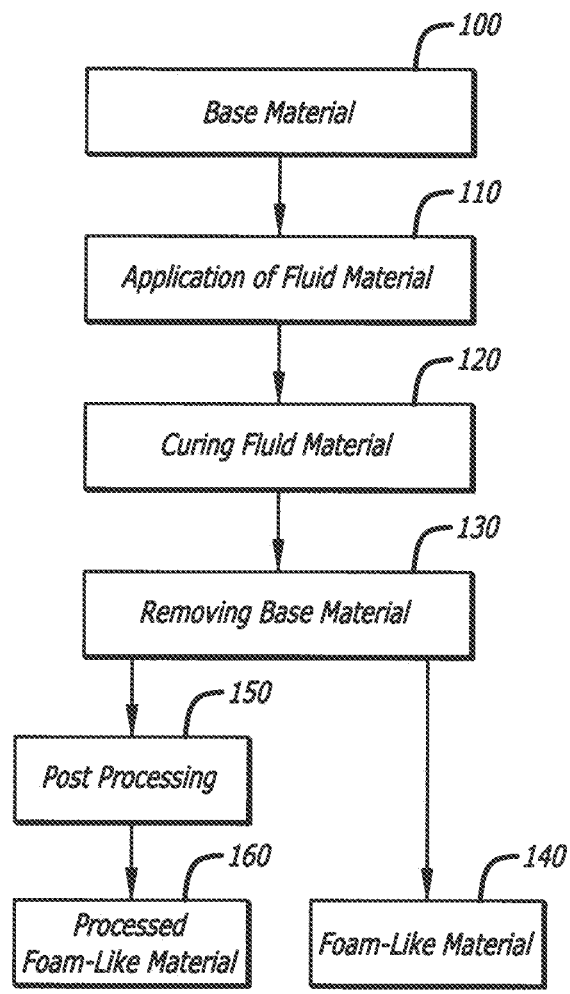
FIG. 10 illustrates an exemplary general method scheme.
Figure 11:
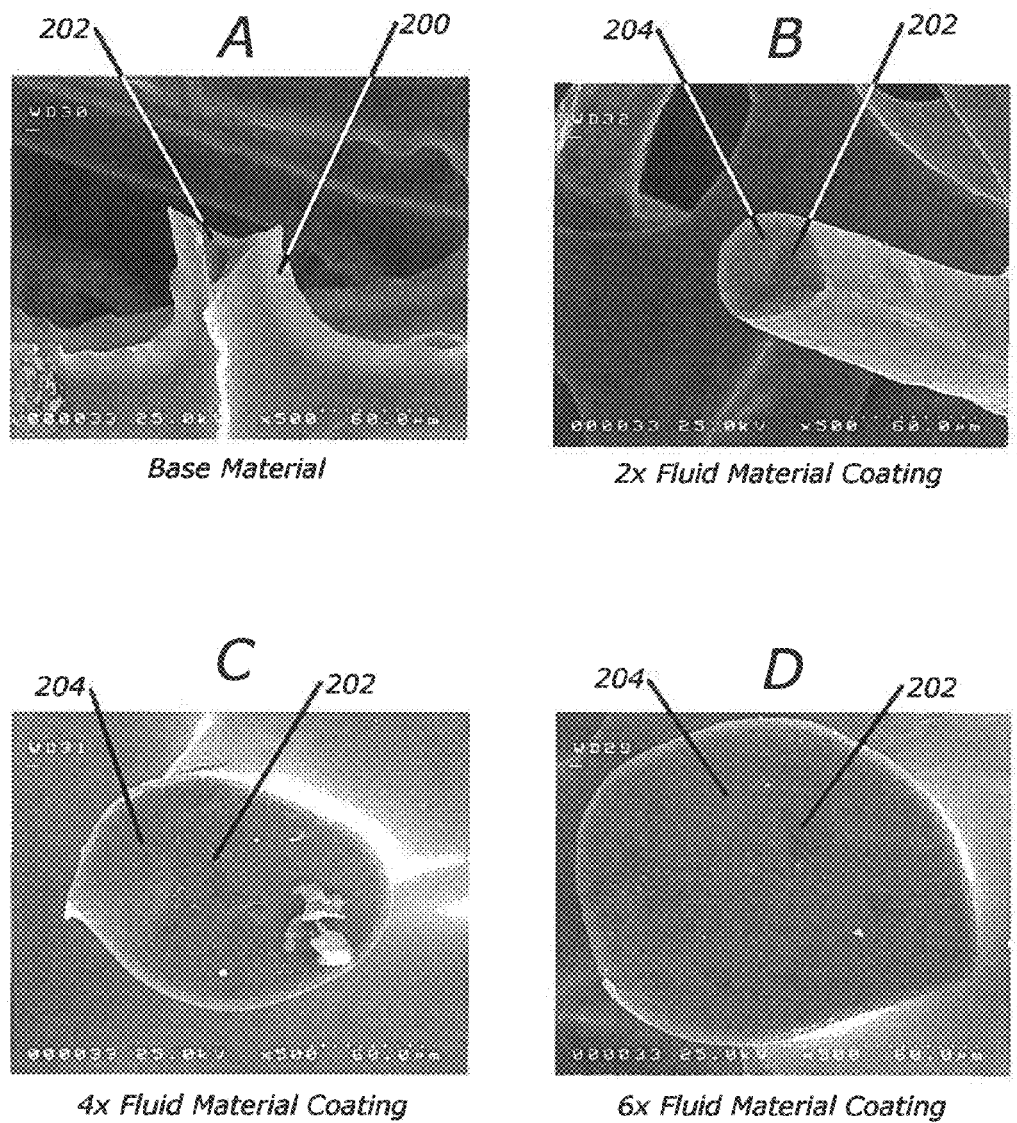
FIG. 11A illustrates a cross-sectional SEM image of a base material strut as described herein.
FIGS. 11B-D illustrate SEM images two coatings, four coatings and six coatings of a fluid material respectively on a base material strut.
Figure 12:
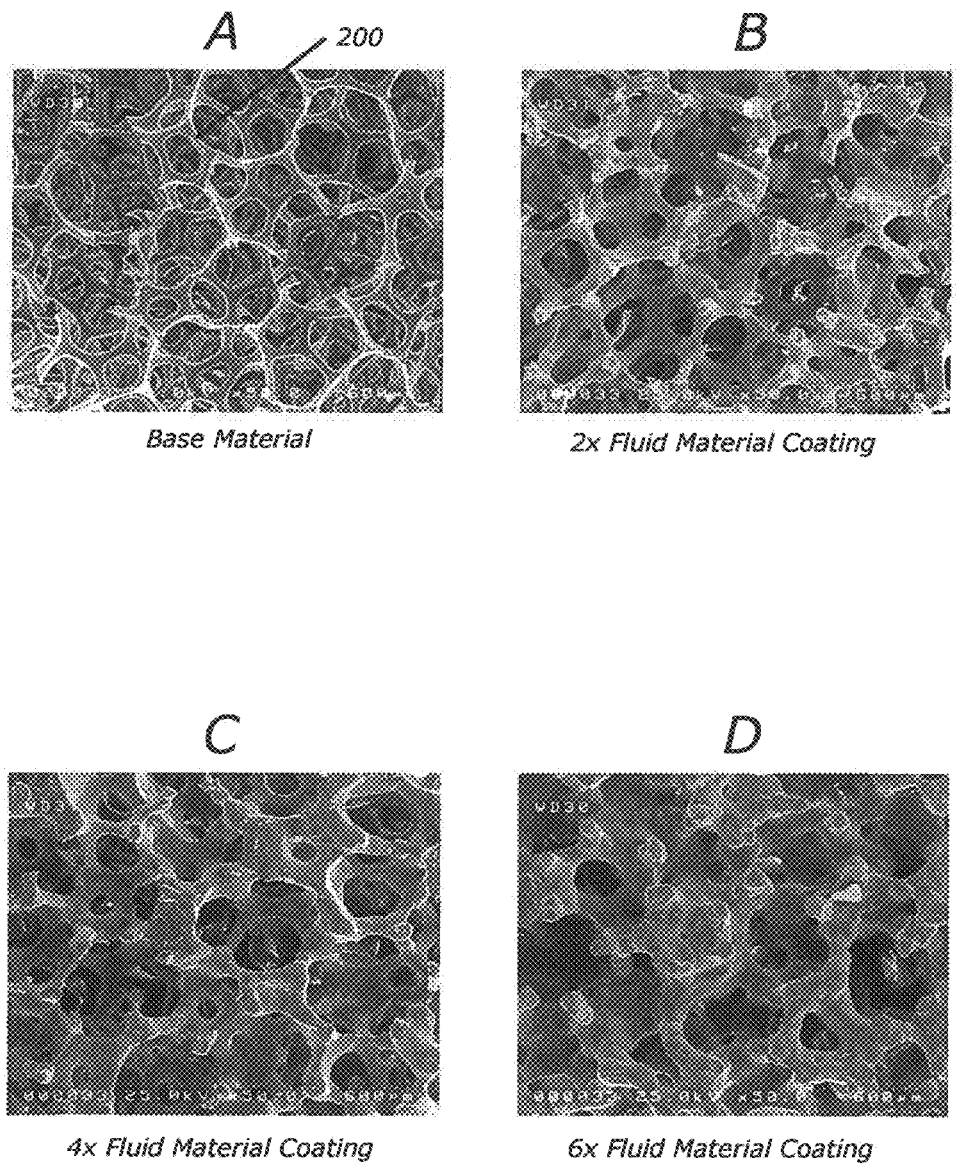
FIG. 12A illustrates an SEM image of a base material as described herein.
FIGS. 12B-D illustrate SEM images of two coatings, four coatings and six coatings of a fluid material respectively on a base material.

Other methods for producing foam-like materials in an industrial setting are described. An overview of exemplary possesses is illustrated in FIG. 10. As a first step 100, an appropriate base material is chosen. FIGS. 11 and 12 illustrate an exemplary base material ready for coating as described herein. As illustrated, the base material forms interconnections between struts 200. FIG. 11A illustrates a cross-section of strut 200 which has a triangular shape 202. It is appreciated by one skilled in the art that a triangular strut shape is one of an almost infinite set of geometries that a strut can assume.

Batch processing, reel to reel processing, and/or conveyor belt processing can be used in the application of one or more fluid materials in order to achieve a high throughput of material, such as on an industrial scale. In a conveyer belt system, formation of a foam-like material or processed foam-like material can be accomplished sequentially in stations or as a continuous process. Bath processing can also be combined with a conveyer belt system wherein several foam-like materials can be produced simultaneously.

In a second step 110, a fluid material is applied to the base material. A fluid material is applied via a coating technique such as, but not limited to, curtain application, spraying, knifing, dipping, and the like. The application of the fluid material can have varying parameters. For example, an airknife blade can be used to remove residual fluid material; however, an airknife need not be use in some embodiments. Likewise, heating of the fluid material can be varied or even not used. Further, a vacuum need or need not be used to facilitate fluid material intrusion into the pores of the base material. Other non-limiting parameters that can be varied include temperature programs, air velocity, pressure, speed of material traveling on conveyor belt, number of coating stations/nozzles, number of airknife stations/nozzles, and number of suction locations to obtain various thicknesses and uniformities of the conformal coat.

Other steps to remove excess fluid material include, but are not limited to, using a vacuum to draw the fluid into the porous surface, using an airknife to blow away excess fluid material, using another means of positive pressure, pressing the base material to squeeze out excess fluid material or a combination of those procedures.

After the fluid material has been properly applied to the base material, the fluid material is cured 120. The fluid material is cured via exposure to an element which activates crosslinking, curing, setting, gelling, solidification, and/or any sort of phase change into a stable form of the fluid material. The method of curing can be different depending on the particular application. For example, RTV silicones can be cured by application of heat, or moist hot air or through addition (e.g., by spraying overtop) of cross-linker and activation of the cross-linker. Hydrogels, on the other hand, can be cross-linked using UV activated cross-linkers, peroxide cross-linkers which are activated by heat, or other cross-linkers which are activated by the addition of a catalyst. Further still, curing can be achieved by simple devolitilization on the conveyer belt, precipitation out of solution, and/or solidification by cooling (e.g., if the polymer is applied in a molten state).

FIGS. 11B-D illustrate a cross section of strut 200 coated two times (FIG. 11B), four times (FIG. 11C) and six times (FIG. 11D). Triangular strut shape 202 can be seen in each circumstance with the coating layer 204 growing larger and larger with each additional coating step. FIGS. 12B-D illustrate, again, the porous base material coated two times, four times and six times respectively.

Next, the base material is removed 130, or leached away, leaving a foam like-material 140 of interest. Here the leaching agent can be sprayed and/or curtain coated onto the cured fluid material/base material composite member, and/or the composite member can be passed through a pool of the leaching agent, or through rollers which apply the leaching agent and squeeze out the air. The leaching can be followed in a similar fashion with a washing step to remove the leaching agent and/or help remove the excess unremoved, unwanted material.

Optionally, the coating and curing steps can be repeated using a post processing step 150. The advantage of repeating the coating and curing steps after the leaching is threefold. 1) If the cured fluid material is partly adversely affected during the leaching step, the application of additional fluid material post leaching can help increase the strength of the cured fluid material. 2) If a fluid material of choice is adversely affected by the post leaching step, a primary sacrificial layer of a first fluid material that is not affected by the leaching step is applied first, then the base material is leached out and the fluid material of choice is then applied unto the empty primary sacrificial layer. The primary sacrificial layer can then be leached by an alternative method that would not affect the fluid material of choice. Hence, the fluid material is cured and left behind unaffected. 3) To fill the void created by leaching out the base material.

Figure 13:
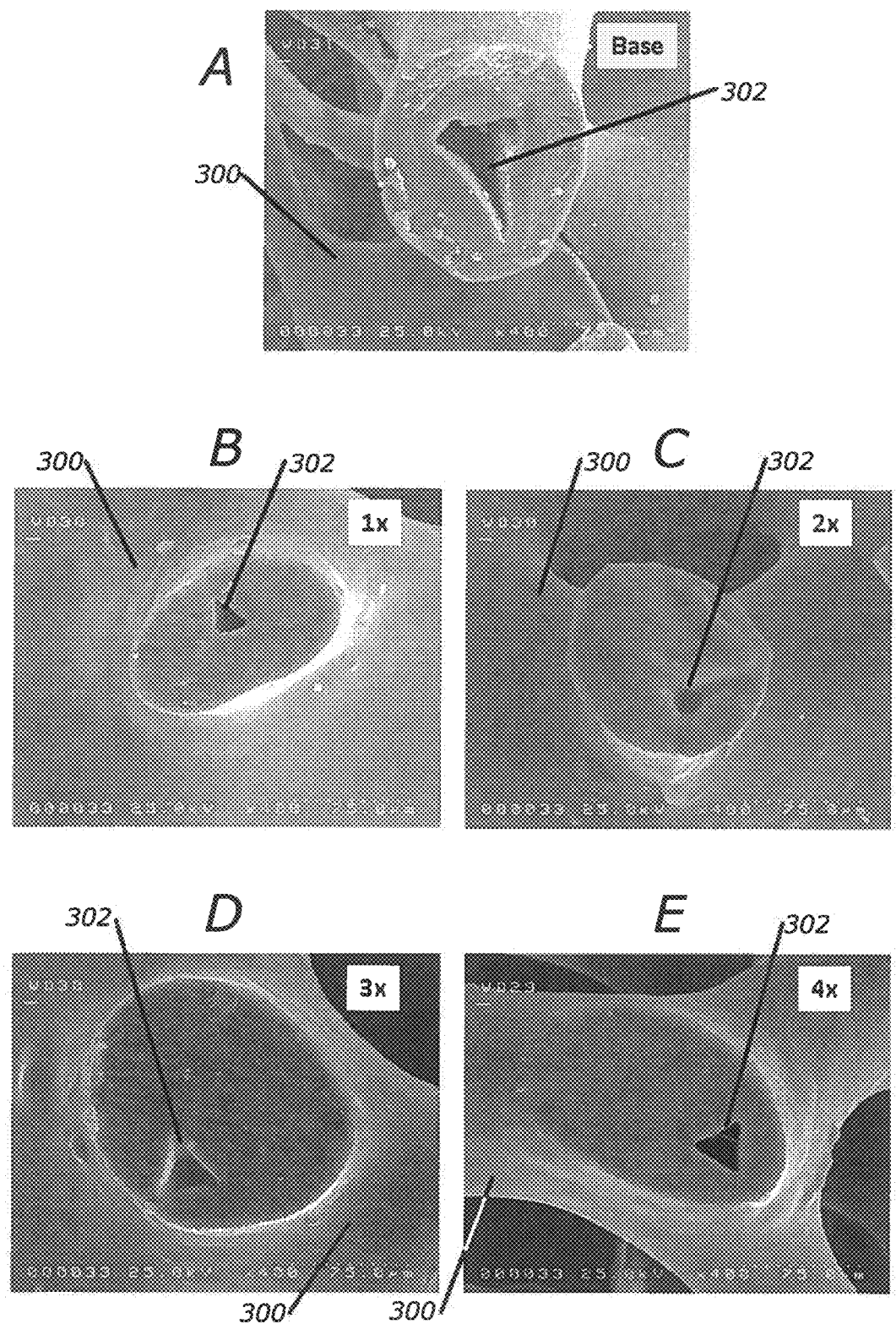
FIG. 13A illustrates an SEM image of a foam-like material as described herein with the base material removed.
FIGS. 13B-E illustrate SEM images of one coating, two coatings, three coatings and four coatings of a fluid material respectively on the foam-like material.

FIG. 13A illustrates a foam-like material 300 wherein the base material has been leached out. In FIG. 13A, void 302 exists where a triangular base member strut previously existed. FIGS. 13B-E illustrate foam-like material 300 further coated one time, two times, three times and four times respectively. FIGS. 13A-E illustrate the thickness of the material as further coatings are applied to the foam-like material 300.

After the post processing step, a processed foam-like material remains having additional coatings and potentially filled voids wherein the base material previously resided. Such a material can be stronger than a non-processed foam-like material. However, a strong foam-like material can produced in some embodiments without the need for optional post processing step(s). For example, a foam-like material substantially formed from a metal fluid material may not need to be subjected to post processing steps.

EXAMPLE 1

Process for Making a Foam-Like Material

A polyurethane open celled foam (the base material) is coated as described herein using a solution of silicone HTV 30% w/v (the fluid material), by either dipping the polyurethane foam in the solution, casting the solution on a sheet of polyurethane or spraying the solution in excess over the sheet of polyurethane. The excess solution is removed by squeezing out the foam, or by vacuum which is applied through a Buchner funnel at the bottom of the foam (in the case of casting the solution over the foam) or by blowing air over the foam as in the case of an air-knife, or in combination of any of the aforementioned.

The foam is then devolitilized in vacuum or by application of mild heat in the case of HTV silicone, such that the solvent is removed, but the HTV silicone is not cured. This can be achieved in the application of the air current during the previous step (the air may or may not be heated).

Finally, the fluid material is cured and the coating layer is affixed unto the foam. The process may be repeated from 1 to about 1000 times (more specifically 1 to 10 times) to achieve various builds (final pore densities)). The polyurethane base material is completely removed from the center of the structure by digestion in hydrogen peroxide/water solution with or without the presence of metal ions and with or without heating. Alternatively, the polyurethane foam can be degraded out by 37% HCl digestion for 1-5 minutes, with vigorous agitation and air removal to facilitate the uniform digestion of the polyurethane, and a subsequent DMSO wash to remove the remnant degradants which are not soluble in the 37% HCl. The degradation/leaching steps can be repeated 1-20 times to achieve various levels of purity. The resulting material is a substantially pure silicone foam-like material.

EXAMPLE 2

Coating a Base Material

A sheet of polyurethane open celled foam base material (20×20 cm) is placed in a container the bottom of which is a fine grate. Vacuum is applied to the bottom of the grate to pull air through the top of the foam into the foam and finally through the grate and out. A solution of about 20% HTV silicone (platinum cured, the fluid material) in chloroform is cast over the foam and pulled through the foam by the vacuum, a jet of air is applied to the foam through an air-knife to remove any remaining solution droplets that are trapped in the foam to clean out the pores. The foam is then devolitized in vacuum at about room temperature for 2 hours. The devolitized foam is finally cured at 120° C. for 1 hour. The process is repeated 3 times. The resulting material is an open celled polyurethane base foam, conformably coated by an approximately 50 μm layer of silicone.

EXAMPLE 3

An Alternate Method of Coating a Base Material

A foam-like material is produced substantially in accordance with Example 1, except that instead of a polyurethane foam base material, a melamine foam is used as the base material. In addition, the base material is not removed from the silicone foam. The resulting foam-like material comprises a highly porous, open celled structure having a melamine base and a silicone overcoat.

EXAMPLE 4

Bath Processing Method of Coating a Base Material

A set of ten 5 cm×5 cm polyurethane open celled foams are loaded into a coating tray and placed on a circular conveyer belt. The belt is moved into the first station wherein the open celled foams are coated using a solution of silicone HTV 30% w/v, by spraying the solution in excess over the sheet of polyurethane. On the way to the second station, the sprayed batch of open celled foams is subjected to an airknife wherein the excess solution is removed from the foams.

At the second station, the foam is then devolitilized by application of mild heat such that the solvent is removed from the applied solution, but the HTV silicone is not cured. After heating, the fluid material is cured and the coating layer is affixed unto the polyurethane foam. The process is repeated 4 times to achieve the proper pore density. The repetition of layers is achieved by the circular conveyer belt with multiple passes through the system.

Then, the bath of coated foams is diverted from the circular conveyer belt and onto an auxiliary belt. At the next station, the polyurethane base material is completely removed from the center of the structure by digestion in hydrogen peroxide/water solution without heat. The resulting material is a substantially pure silicone foam-like material.

The foam-like materials are then diverted to another circular conveyer belt to be further coated as described above. The foam-like materials are coated an additional four times resulting in a processed foam-like material that is stronger.

EXAMPLE 5

Forming a Composite Material

A sheet of polyurethane open celled foam base material (20×20 cm) is placed in a container the bottom of which is a fine grate. Vacuum is applied to the bottom of the grate to pull air through the top of the foam into the foam and finally through the grate and out. A solution of MED-4850, a high durometer silicone, is cast over the foam and pulled through the foam by the vacuum, a jet of air is applied to the foam through an air-knife to remove any remaining solution droplets that are trapped in the foam to clean out the pores. The foam is then devolitized in vacuum at about room temperature for 2 hours and cured at 120° C. for 1 hour.

Then, a second coating is applied by casting a solution of MED-4830, a lower durometer silicone, over the cured first coating. The solution is pulled through the foam by the vacuum, a jet of air is applied to the foam through an air-knife to remove any remaining solution droplets that are trapped in the foam to clean out the pores. The foam is then devolitized in vacuum at about room temperature for 2 hours and cured at 120° C. for 1 hour.

Then, a third coating is applied by casting a solution of MED-4815, an even lower durometer silicone, over the cured second coating. The solution is pulled through the foam by the vacuum, a jet of air is applied to the foam through an air-knife to remove any remaining solution droplets that are trapped in the foam to clean out the pores. The foam is then devolitized in vacuum at about room temperature for 2 hours and cured at 120° C. for 1 hour.

Then, a fourth final coating is applied by casting a solution of MED-4801, the lowest durometer silicone used, over the cured third coating. The solution is pulled through the foam by the vacuum, a jet of air is applied to the foam through an air-knife to remove any remaining solution droplets that are trapped in the foam to clean out the pores. The foam is then devolitized in vacuum at about room temperature for 2 hours and cured at 120° C. for 1 hour.

The resulting material is an open celled polyurethane base foam, conformably coated by an approximately 200 μm layer of decreasing durometer silicone. The polyurethane base material can be optionally removed from the composite member. Other composite materials can be similarly made.

EXAMPLE 6

A 20 cm diameter disc (3 mm thick) of polyurethane open celled foam with a pore density of 40 ppi (the base material) is coated as described herein using a dispersion of Viton® HTV 20% w/w in Methyl Ethyl Ketone (a fluoroelastomer available from DuPont Dow Elastomers), by casting the dispersion in excess onto the base material placed in a Buchner funnel. The excess dispersion is removed by vacuum which is applied through the Buchner funnel at the bottom of the foam. The fluid material coated base material is then transferred from the Buchner funnel to a fine metal grate and an air-knife set to 100 psi is used to remove any remaining fluid material and ensure the open cell nature of the composite material (fluid material coated base material). The composite material is then placed in an oven for 1 hour at 126° C. to cure the Viton® fluid material. The composite material is then coated with the fluid material and cured in an oven in the same process five additional times. The resulting composite material is then leached for 24 hours in Dimethyl Sulfoxide with vigorous agitation to remove the polyurethane base material. After 24 hours the resulting material is washed in DI water for 5 minutes and then heated to 180° C. to remove the excess Dimethyl Sulfoxide. The resulting material is a substantially pure fluoroelastomeric foamlike material.

EXAMPLE 7

A 15 cm diameter disc (5 mm thick) of polyurethane open celled foam with a pore density of 70 ppi (the base material) is coated as described herein using a dispersion of Styrene Isoprene Styrene 14% Styrene at 25% w/w in Xylene(the fluid material), by casting the dispersion in excess onto the base material placed in a Buchner funnel. The excess dispersion is removed by vacuum which is applied through the Buchner funnel at the bottom of the foam. The fluid material coated base material is then transferred from the Buchner funnel to a fine metal grate and an air-knife set to 150 psi is used to remove any remaining fluid material and ensure the open cell nature of the composite material (fluid material coated base material). The composite material is then allowed to dry for 30 minutes at room temperature. The composite material is then coated with the fluid material and dried in the same process two additional times. The resulting composite material is then leached for 48 hours in Dimethyl Sulfoxide with gentle agitation to remove the polyurethane base material. After 48 hours the resulting material is washed in Dl water for 30 minutes and dried. The resulting material is a substantially pure Styrene Isoprene Styrene foamlike material.

While this invention has been described with respect to various specific examples and embodiments, it is to be understood that the invention is not limited thereto and that it can be variously practiced within the scope of the invention.

Unless otherwise indicated, all numbers expressing quantities of ingredients, properties such as molecular weight, reaction conditions, and so forth used in the specification and claims are to be understood as being modified in all instances by the term "about." Accordingly, unless indicated to the contrary, the numerical parameters set forth in the specification and attached claims are approximations that may vary depending upon the desired properties sought to be obtained by the present invention. At the very least, and not as an attempt to limit the application of the doctrine of equivalents to the scope of the claims, each numerical parameter should at least be construed in light of the number of reported significant digits and by applying ordinary rounding techniques. Notwithstanding that the numerical ranges and parameters setting forth the broad scope of the invention are approximations, the numerical values set forth in the specific examples are reported as precisely as possible. Any numerical value, however, inherently contains certain errors necessarily resulting from the standard deviation found in their respective testing measurements.

The terms "a," "an," "the" and similar referents used in the context of describing the invention (especially in the context of the following claims) are to be construed to cover both the singular and the plural, unless otherwise indicated herein or clearly contradicted by context. Recitation of ranges of values herein is merely intended to serve as a shorthand method of referring individually to each separate value falling within the range. Unless otherwise indicated herein, each individual value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein is intended merely to better illuminate the invention and does not pose a limitation on the scope of the invention otherwise claimed. No language in the specification should be construed as indicating any non-claimed element essential to the practice of the invention.

Groupings of alternative elements or embodiments of the invention disclosed herein are not to be construed as limitations. Each group member may be referred to and claimed individually or in any combination with other members of the group or other elements found herein. It is anticipated that one or more members of a group may be included in, or deleted from, a group for reasons of convenience and/or patentability. When any such inclusion or deletion occurs, the specification is deemed to contain the group as modified thus fulfilling the written description of all Markush groups used in the appended claims.

Certain embodiments of this invention are described herein, including the best mode known to the inventors for carrying out the invention. Of course, variations on these described embodiments will become apparent to those of ordinary skill in the art upon reading the foregoing description. The inventor expects skilled artisans to employ such variations as appropriate, and the inventors intend for the invention to be practiced otherwise than specifically described herein. Accordingly, this invention includes all modifications and equivalents of the subject matter recited in the claims appended hereto as permitted by applicable law. Moreover, any combination of the above-described elements in all possible variations thereof is encompassed by the invention unless otherwise indicated herein or otherwise clearly contradicted by context.

In closing, it is to be understood that the embodiments of the invention disclosed herein are illustrative of the principles of the present invention. Other modifications that may be employed are within the scope of the invention. Thus, by way of example, but not of limitation, alternative configurations of the present invention may be utilized in accordance with the teachings herein. Accordingly, the present invention is not limited to that precisely as shown and described.

What is claimed is:

1. A method of making a foam-like material comprising:
   providing a polyurethane foam base material having a porous surface;
   contacting the base material with a first fluid material;
   drawing the first fluid material into intimate contact with the base material to form a conformal coat of the first fluid material on the base material, the conformal coat having a thickness of about 50 µm to about 100 µm;
   curing the conformal coat on the base material; and
   removing the base material from the cured conformal coat, resulting in a foam-like material comprising the cured first fluid material, the foam-like material having a porous surface conforming to a polyurethane foam.

2. The method of claim 1 wherein the step of drawing the first fluid material into intimate contact with the base material includes using a vacuum.

3. The method of claim 2 further comprising using positive air pressure to blow away excess fluid material from the base material before the step of curing.

4. The method of claim 1 wherein the first fluid material is a silicone elastomer dispersion.

5. The method of claim 1 wherein the first fluid material is a Styrene Isoprene Styrene dispersion.

6. The method of claim 1 wherein the first fluid material is a fluoroelastomer dispersion.

7. The method of claim 1, wherein the base material is removed by dissolution.

8. The method of claim 1 wherein the base material is a polyurethane foam and the first fluid material is a fluoroelastomer dispersion.

9. The method of claim 1 wherein the base material is a polyurethane foam and the first fluid material is a styrene isoprene styrene dispersion.

10. The method of claim 1 wherein the step of removing the base material comprises removing the base material from the cured first fluid material.

11. The method of claim 1 wherein the step of removing the base material comprises contacting the base material with a solution, mixture suspension, emulsion, dispersion or combination thereof capable of dissolving the base material.

12. The method of claim 1 wherein the step of removing at least a portion of the base material comprises degradation or dissolution of the base material with a base, a solvent, an enzyme, an acid, heat, oxidation, ultraviolet light, gamma irradiation, visible light, infrared light or a combination thereof.

* * * * *

UNITED STATES PATENT AND TRADEMARK OFFICE
CERTIFICATE OF CORRECTION

PATENT NO. : 8,679,570 B2  
APPLICATION NO. : 13/093505  
DATED : March 25, 2014  
INVENTOR(S) : Alexei Goraltchouk et al.

Page 1 of 1

It is certified that error appears in the above-identified patent and that said Letters Patent is hereby corrected as shown below:

On the Title Page

On page 4, in column 2, under "Other Publications", line 10, delete "Anals" and insert -- Annals --, therefor.

In the Specification

In column 2, line 48, delete "quarternaly" and insert -- quaternary --, therefor.

In column 6, line 48, delete "quarternaly" and insert -- quaternary --, therefor.

In column 7, line 32, after "foam" insert -- 24. --.

In column 7, line 55, delete "bioerodable," and insert -- bioerodible, --, therefor.

In column 7, line 62, delete "copoly(ether-esters)" and insert -- co-poly(ether-esters) --, therefor.

In column 10, line 24, delete "use" and insert -- used --, therefor.

In column 10, line 53, delete "devolitization" and insert -- devolatization --, therefor.

In column 11, line 56, delete "devolitilized" and insert -- devolatized --, therefor.

In column 12, line 54, delete "devolitilized" and insert -- devolatized --, therefor.

In column 13, line 19, delete "devolitized" and insert -- devolatized --, therefor.

In column 13, line 26, delete "devolitized" and insert -- devolatized --, therefor.

In column 12, line 35, delete "devolitized" and insert -- devolatized --, therefor.

In column 12, line 54, delete "devolitized" and insert -- devolatized --, therefor.

In column 14, line 30, delete "DI" and insert -- DI --, therefor.

Signed and Sealed this  
Twenty-sixth Day of May, 2015

Michelle K. Lee  
*Director of the United States Patent and Trademark Office*